United States Patent Office 3,563,913
Patented Feb. 16, 1971

3,563,913
SILVER CATALYST PRODUCTION
Gerrit de Krijger and Freddy Wattimena, Amsterdam, Netherlands, assignors to Shell Oil Company, New York, N.Y., a corporation of Delaware
No Drawing. Filed Oct. 24, 1968, Ser. No. 770,432
Claims priority, application Great Britain, Oct. 30, 1967, 49,261/67
Int. Cl. B01j *11/06*
U.S. Cl. 252—463                    5 Claims

ABSTRACT OF THE DISCLOSURE

Improved supported silver catalysts are prepared by impregnating a support with a solution of a reducible silver compound and passing the impregnated support, in the presence of a reducing agent, through a fluidized bed of inert particulate solids at an elevated temperature.

---

This invention relates to an improved process for the production of supported silver catalysts.

Silver containing catalysts find application as catalysts in various important catalytic processes including, for example, the catalytic oxidation of olefinic hydrocarbons to the corresponding epoxides as ethylene to ethylene oxide, etc.

The efficient utilization of a silver catalyst in a specific process in terms of cast production and its effectiveness as a catalyst is dependent upon the method of its manufacture. In the course of production of a supported silver catalyst its catalytic properties are often adversely affected by the severity of conditions to which it is subjected and particularly the length of time to which it must be subjected to these conditions.

In copending application Ser. No. 686,034, filed Nov. 28, 1967, there is disclosed and claimed an improved method for the preparation of supported silver catalysts reducing substantially the number of steps and time involved. In the course of the therein claimed process the support is impregnated with a solution of a reducible silver compound and the impregnated support subjected to an elevated temperature in the presence of a reducing agent for a relatively short period of time.

It is an object of the present invention to provide an improved process enabling the manufacture of the desired active supported silver catalyst with still greater efficiency.

In accordance with the present invention an improved supported silver catalyst, particularly suitable for use as catalyst in the incomplete direct oxidation, in vapor phase, of olefins to the corresponding olefin oxides, is produced by impregnating a suitable catalyst support material with a reducible silver compound and thereafter heating the impregnated support for only a relatively short period of time, in the presence of a reducing agent, by contact with a bed of fluidized inert solids maintained at an elevated temperature.

The invention is applied with particular advantage to the preparation of supported silver catalysts wherein the support material consists essentially of particles in which the maximum distance along a straight line between two points of the space taken up by any one particle is in the range of from about 1 to about 25 mm., preferably from about 2 to about 9 mm.; particularly preferred are those in the range of from about 3 to about 7 mm. Larger particles may be used within the scope of the invention. In the latter case the finished catalyst can then be reduced in particle size by conventional means.

Support materials suitable for use as starting material in the process of the invention comprise broadly the known catalyst support materials including, for example, pumice, ceramic materials, silicon carbide, the siliceous and aluminous materials of natural or synthetic origin such as the aluminas, bauxite, silica, silica-alumina, etc. Support materials of porous structure are generally preferred. A particularly preferred catalyst support comprises alpha-alumina; especially that having a pare volume per gram in the range of from about 0.15 to about 0.30 cc./g. and a surface area below 10 m.$^2$/g., preferably below about 1 m.$^2$/g. A carrier material which has been employed with very good results is commercially available alpha-alumina having a pore volume in the range of from about 0.17 to about 0.24 cc./g. and a surface area in the range of from about 0.050 to about 0.055 m.$^2$/g.

In this specification and attached claims "reducible silver compounds" are understood to be compounds from which metallic silver may be obtained by chemical reduction or by the combined action of thermal decomposition and chemical reduction or by the combined action of thermal decomposition and chemical reduction. Such compounds include, for example, silver nitrate, silver carbonate, ammoniacal silver complexes; silver salts of carboxylic acids, such as formic, acetic, propionic, maleic, lactic, tartaric, salicylic and maleic acid and the like. Since in the process of this invention these compounds are generally added to the catalyst support material as solutions, the suitable silver compounds are usually those which are readily soluble, i.e. in concentrations of at least 10 g. per litre, preferably at least 50 g. per litre, in the liquid media used as solvents. A particularly suitable silver compound is silver nitrate and may be employed as an aqueous solution. Concentrations of the silver compound in the impregnation solution should generally be adjusted to provide a silver content in the final catalyst of between about 3 and about 25% w., preferably between about 5 and about 15% w., calculated as weight of silver metal on the weight of the porous support.

Essential to the attainment of the objects of the present invention is the rapid evaporation of absorbed liquid from the impregnated support in the presence of a reducing agent and with the aid of a fluidized bed of inert solid material at an elevated temperature. In the broadest aspect the terms "shock drying," "rapid evaporation" or "rapid drying" as used herein and in the attached claims mean the treatment in the fluidized bed of heated inert solids during which at least 80% v. of the liquid absorbed by the impregnated support is removed therefrom by evaporation in a period of at most about 900 seconds. By "absorbed" liquid it is intended to mean broadly retained on the surface and in the pores of the support whether by absorption, adsorption or occlusion. During the rapid drying step, the silver compounds in the absorbed liquids are reduced by the action of the reducing agent, the presence of which during the drying step is essential to the catalyst-producing process of the invention. As a direct result of this reduction during the course of the rapid drying step, a thin film of metallic silver possessing improved characteristics is deposited upon the surface of the support.

Critical to the process of the invention is the simultaneous rapid drying of the impregnated support and deposition of metallic silver in one and the same step. Moreover, it is essential that this step be carried out within a well-defined very short period of time. It is this critical combination of conditions which enables the formation of the catalyst wherein the silver surface presents a very fine and even layer which is uniformly deposited upon the entire surface of the support. The improved catalytic activity of the catalyst when used in fluidized state, particularly with respect to the catalytic oxidation of olefins to olefin oxides, is directly attributable to characteristics peculiar to the homogeneously distributed very fine silver particles obtained in the catalyst by the presently-defined method. The catalyst so produced has proved to be exceedingly efficient in the oxidation of olefins to olefin oxides in a fluidized system.

Without intent to limit the scope of the invention by theoretical explanation, it is believed that the excellent uniformity of the silver surface of these catalysts, the extremely fine size of the particles forming this surface, and the characteristics peculiar thereto, are obtained because the very rapid removal of liquid constituents comprised in the impregnating solution, combined with a highly efficient conversion under these conditions of the silver compounds in these solutions, prevents migration of silver from the inner to the outer pores of the support during the drying step, so that the silver is evenly deposited within the surface of all pores.

In addition, it is noted here that the process of the invention, apart from yielding catalysts having excellent fluidizing characteristics, is also very attractive because it is so simple and practical.

Suitable reducing agents which must be present during the rapid drying step, comprise, for example, hydrazine and hydroxylamine. Organic reducing agents are, however, generally preferred. These include, for instance, ethanolamine, methanol, isopropyl alcohol, acetone, formaldehyde, acetaldehyde, formic acid, and the like. Preferred organic reducing agents comprise polyhydric alcohols, such as ethylene glycol, propylene glycol, butylene glycol, polyvinyl alcohol, polyethylene glycol, polypropylene glycol, glycerol, glucose and sucrose and the like. The presence of the reducing agents during the rapid-drying treatment is as a rule most advantageously ensured by adding them to the solutions of silver compounds used to impregnate the support materials. The impregnating solution may comprise the reducing agent as such as vehicle for a silver compound reducible under the defined drying conditions. In general, the impregnating solution will comprise in addition to the reducing agent, a solvent in which the silver compound possesses appreciable solubility and which is substantially inert under the conditions of the rapid drying-reducing step. Water is a suitable inert solvent, and aqueous impregnating solutions are preferably employed. When polyhydric alcohols are employed as reducing agents, their incorporation in aqueous impregnation solutions is very beneficial, since these surfactants, for example, ethylene glycol, significantly facilitate the homogeneous penetration of the solutions into the smallest pores of the supports. The weight ratio of reducing agent to water in the aqueous suitable impregnating solutions may vary within wide limits, provided the amount of reducing agent is balanced with the amount of silver compound in the solution in order to give appropriate deposition of silver during the drying treatment. Ratios by weight of water to reducing agent in the approximate range of 20.80 to 80:20 are generally most effective.

After impregnation of the support but before the impregnated support is subjected to the rapid drying-reducing step, any excess of impregnation liquid is removed by suitable means which may comprise one or more steps such as decantation, centrifuging, filtration or similar procedure. A certain degree of predrying of the impregnated support may be tolerated provided, however, that such predrying does not remove any substantial amount of reducing agent absorbed in the pores of the carrier.

The rapid drying step, involving simultaneous reduction of the silver compound, is carried out at conditions of very high evaporating efficiency which enable the reducing agent to form the characteristic deposit of metallic silver from the impregnating solution.

In accordance with the invention the rapid drying treatment of the impregnated support leading to the improved silver catalysts is carried out in a fluidized bed of particulate inert solid materials. The fluidized bed is preferably composed of particles having a smaller diameter than that of the impregnated support. Thus the fluidized inert particles may have a maximum diameter of, for example, about 0.5 mm., and preferably in the range of from about 0.035 to about 0.35 mm. Suitable particulate inert materials employed as the fluidized bed comprise broadly any inert solid substance having a maximum particle diameter of 0.5 mm. These may be of porous or non-porous structure. Suitable non-porous materials comprise, for example, glass, quartz, and the like. Suitable inert porous materials comprise, for example, pumice, ceramic materials, silicon carbide, the siliceous and aluminous materials of natural or synthetic origin, as the aluminas, silica, and the like. It is preferred to use inert particulate materials with a relatively small surface area. Those having a surface area of less than about 1 m.$^2$/g. are satisfactory.

The inert, solid, particulate materials having the maximum particle diameter of about 0.5 mm. are kept in a fluidized state during the rapid drying step by means of a stream of gas. The specific gas used is not critical, provided it does not interfere with the rapid drying process step or with any desired chemical reaction taking place on the particulate impregnated solids being treated, e.g. formation of the catalytically active material in situ. In general organ, helium, hydrogen, carbon dioxide, nitrogen or oxygen gas are suitable; air is generally preferred for economic reasons, if it can be used in view of the previso mentioned above.

The temperature of the fluidized bed is regulated according to particular circumstances such as the specific material to be treated, type of solvents to be removed, and type of chemical reaction leading to the active catalyst state to be performed on the solid particles. In general fluidized bed temperatures from about 200 to about 900° C. are suitable; temperatures from about 400 to about 800° C. are generally preferred.

The residence time in the fluidized bed of the impregnated particles is kept as short as possible while still assuring adequate solvent removal from the impregnated particles with concomitant formation of the active silver catalyst. In general residence times of from about 1 to about 120 seconds are sufficient. When water is the main solvent to be removed, residence times of about 2 to about 30 seconds generally suffice.

It has been found that in the presence of the particles which form the fluidized bed under the conditions of the invention, the heat exchange between the impregnated particles charged thereto and the upward flowing gas is considerably increased. As a result the gas flow rate may be substantially reduced and the total amount of gas required per kilogram of the particulate solid material undergoing treatment is much less than would otherwise be the case. The process thus additionally enables substantial reduction in the length of time to which the impregnated particles must be subjected to solvent removal and active silver forming conditions.

Introduction of impregnated support into the fluidized bed, and removal of catalyst from the fluidized bed may be effected by any suitable conventional means. In one embodiment of the invention the impregnated support is transported by gravity through the fluidized bed of particles of smaller diameter than the diameter of the impregnated particles. Finished catalyst is drawn continuously or intermittently from a lower part of the fluidized bed.

The activity and selectivity of the silver catalysts of the invention for hydrocarbon oxidation reactions may further be increased by incorporating one or more compounds of alkaline-earth metals or alkali metals, for example, lithium compounds, as promoters. Although such promoters may be added after the silver surface has been formed, the desirable effects obtained with these promoting materials are more pronounced when these are present during the rapid drying stage of the process. They are preferably added to the catalyst support before the latter is impregnated with the silver compound containing solutions. Particularly suitable promoters are the metal oxides and compounds which can be thermally decomposed or converted into the oxides by heat treatment with oxygen or oxygen-containing gas mixtures. Examples of the latter group of compounds are hydroxides, carbonates, nitrates, acetates, propionates, lactates and oxalates. The addition of promoters to the catalysts or to the supports may be effected by any suitable method, impregnation with aqueous solutions giving excellent results. Heat treatment may be applied to effect thermal and/or chemical conversion of the said metal compounds into metal oxides, before the support is impregnated with the silver-containing solution. Such preheating of the promoter-containing particles of the porous supports may be effected at temperatures between about 350 and about 650° C., more preferably between about 400 and about 550° C. At the latter preferred temperatures the promoters are strongly bonded to the surface of the support.

The amount of the promoting material in the final catalyst is as a rule very small; preferred amounts lying between about 0.03 and 0.5% w., calculated as metal oxide on the weight of the support.

The silver catalysts of the invention have been shown to be highly efficient catalysts for the direct oxidation of olefins with molecular oxygen to olefin oxides in fixed bed or fluidized systems. They are applied with particular advantage to the oxidation of ethylene to ethylene oxide. The conditions for carrying out olefinic hydrocarbon oxidation reactions in the presence of the silver catalysts are those used in the silver-catalyzed olefinic hydrocarbon processes disclosed heretofore. This applies, for example, to suitable temperatures, pressures, residence times, presence or absence of diluent materials, such as nitrogen, carbon dioxide, steam, argon, methane or other saturated hydrocarbons, presence or absence of moderating agents to control the catalytic action, for example, 1,2-dichloroethane or chlorinated polyphenyl compounds, the use of recycle operation or the use of plural reaction stages, and other conditions disclosed heretofore in the preparation of ethylene oxide, propylene oxide or other olefin oxides from the corresponding olefins.

EXAMPLE I 150 g. of commercial alpha-alumina having a pore volume of 0.17 cm.$^3$/g. and a surface area of less than 1 m.$^2$/g., in the form of pellets having a diameter of 5 mm., was impregnated with an aqueous solution of 0.62 g. lithium hydroxide in 25.5 ml. water. The pellets were then calcined at 450° C. for two hours; they contained 0.26% w. Li$_2$O. The pellets so obtained were then impregnated with a solution of 25.5 g. silver nitrate in a mixture of 19.1 g. water and 7.1 g. ethylene glycol.

In a vertically placed cylindrical reactor having a diameter of 4 cm. and a length of 72.5 cm., 500 g. of a powdered commercial alpha-alumina having a maximum particle diameter between 0.053 and 0.297 mm., a pore volume of 0.18 cm.$^3$/g. and a surface area of less than 1 m.$^2$/g. was fluidized by means of a stream of air. The reactor contents were kept at a temperature of 600° C. The height of the column of fluidized particles in the reactor was about 50 cm.

The impregnated pellets were dropped through the fluidized bed at a rate of about 1500 g./h. The residence time of each pellet in the fluidized bed was between 5 and 15 seconds.

The resulting catalyst pellets collected at the bottom of the cylindrical reactor. The solvents originally present in the impregnated pellets charged to the fluidized bed had been thoroughly removed, since heating of the resulting catalyst pellets at 500° C. for six hours resulted in a weight loss of only 0.6 g.

The catalyst pellets so obtained showed good catalytic activity in the oxidation of ethylene to ethylene oxide with the aid of oxygen, as shown by the following experiment. 100 g. of the catalyst pellets were broken to particles having a diameter of 0.6–1.2 mm., and of these particles a fixed bed was prepared. Over this bed a stream consisting of 25% m. ethene, 8.7% m. oxygen and 66.3% m. nitrogen (and containing 0.38 p.p.m. of chlorinated polyphenyl) was led at a velocity of 104 b. gas per kg. catalyst per hour, a temperature of 275–278° C. and a residence time of 9.7 seconds.

The ethylene conversion was 5%, the selectivity to ethylene oxide was 66.1% of the ethylene converted, the remainder of the ethylene converted being oxidized to carbon dioxide.

EXAMPLE II 150 g. of the alpha-alumina pellets, having a diameter of 5 mm., described in foregoing Example I were impregnated with a solution of 25.5 g. of silver nitrate in a mixture of 19.1 g. water and 7.1 g. ethylene glycol.

In a vertically placed cylindrical reactor with a diameter of 10 cm. and a length of 75 cm., 2000 g. of powdered commercial alpha-alumina with a maximum particle diameter between 0.053 and 0.297 mm., a pore volume of 0.18 cm.$^3$/g. and a surface area of less than 1 m.$^2$/g., was fluidized by means of a stream of air. The reactor was kept at a temperature of 500° C. The height of the column of fluidized particles was about 40 cm.

The impregnated pellets were dropped through the fluidized bed at a rate of 1500 g. per hour. The residence time of each pellet in the fluidized bed was between 8 and 15 seconds.

The resulting catalyst pellets were collected at the bottom of the cylindrical reactor. The solvents had been thoroughly removed, since heating of the dried pellets at 500° C. for six hours resulted in a weight loss of only 0.5 g.

Use of the resulting pelleted catalyst in the oxidation of ethylene to ethylene oxide under the conditions set forth in the foregoing Example I results in substantially the results set forth in the foregoing Example I.

The invention claimed is:

1. The process for the production of a silver catalyst particularly suitable for use in the silver-catalyzed oxidation of olefinic hydrocarbons which consists essentially of impregnating a particulate catalyst support material having a maximum particle diameter of from about 1 to about 25 mm. with a solution of silver nitrate and subjecting the resulting impregnated support to a temperature of from about 200 to about 900° C., in the presence of a polyhydric alcohol, in a fluidized bed of inert particulate solids having a maximum particle diameter of about 0.5 mm.

2. The process in accordance with claim 1 wherein said catalyst support material and said fluidized particulate inert solids are an aluminous material.

3. The process in accordance with claim 2 wherein said aluminous material is alumina.

4. The process in accordance with claim 3 wherein said polyhydric alcohol is ethylene glycol.

5. The process for the production of a fluidized silver catalyst particularly suitable for use in the silver-catalyzed oxidation of olefinic hydrocarbons which consists essentially of impregnating alpha-alumina particles having a maximum particle diameter of from about 1 to about 25 mm. with an aqueous solution of silver nitrate and ethylene glycol and transporting the resulting impregnated alpha-alumina particles through a fluidized bed of alpha-alumina particles having a maximum particle diameter of from about 0.035 to about 0.35 mm. and a surface area of less than 1 m.$^2$/g. at a temperature in the range of from about 400 to about 800° C.

References Cited

UNITED STATES PATENTS

| | | | |
|---|---|---|---|
| 2,825,701 | 3/1958 | Hermann | 252—475 |
| 3,444,048 | 5/1969 | Schmeling | 202—121 |
| 3,384,557 | 5/1968 | Saller | 201—22 |
| 2,404,438 | 7/1946 | Evans | 260—348.5 |
| 2,709,173 | 5/1955 | Brengle | 260—348.5 |
| 2,920,052 | 1/1960 | Martin | 252—463 |

FOREIGN PATENTS 522,234  12/1938  England _____ 252—475

DANIEL E. WYMAN, Primary Examiner

P. M. FRENCH, Assistant Examiner

U.S. Cl. X.R.

252—477